Patented Oct. 4, 1949

2,483,984

UNITED STATES PATENT OFFICE 2,483,984

PHENYL THIOSALICYLATE AS A CATALYTIC PLASTICIZER FOR RUBBER

Scott Searles, Jr., Minneapolis, Minn., assignor to American Cyanamid Company, New York, N. Y., a corporation of Maine No Drawing. Application August 30, 1946, Serial No. 694,164

6 Claims. (Cl. 260—30.8)

This invention relates to a novel plasticizer for elastomeric materials and to plasticizable and plasticized elastomeric compositions prepared therewith.

In the manufacture of rubber goods, efficient processing, i. e., milling, calendering, extruding, molding and the like, requires that the rubber be plasticized. This is done in order that production schedules can be met with fewer defective products and with reasonable charges for power, labor and equipment. As a consequence, the plasticizing of rubber has become in itself a highly developed art.

One such procedure is the plasticizing of rubber or synthetic rubbers by the action of hot air or oxygen under suitable conditions. Others are based on the fact that small amounts of chemicals, for example some of the aromatic mercaptans and certain nitroso compounds, can be utilized under various conditions to produce the desired effect. While the exact nature of their action is not completely understood, the use of these chemical plasticizers or "peptizers" has become well known. It is with their manufacture and use that the present invention is concerned.

In the past, the available plasticizers have been objectionable for one or more of several reasons. Some are not suitably compatible with various elastomers. Some are toxic. Many operate either as skin irritants or skin sensitizers, resulting in objections from those who are obliged to handle the material. Others are characterized by very disagreeable odors which are often imparted to the finished articles. Many of the commonly used materials are subject to several such objections. As a result of these objectionable features, the use of plasticizers has tended to be limited in spite of the wide demand for materials for the purpose.

When the necessity arose for handling synthetic, rubber-like polymers, such, for example, as copolymers of butadiene and styrene or butadiene and acrylonitrile, operational difficulties became much more pronounced. These synthetic rubbers were found to be much more difficult to process than natural rubber. Therefore, the demand for effective plasticizers or "peptizers" which are not subject to the objectionable properties of materials previously used was markedly increased.

It is, therefore, the principal object of the present invention to develop a new plasticizer, suitable for use in both natural and synthetic rubber compositions, which will not be unduly toxic, will not have or impart objectionable odors and which, in handling does not unduly sensitize or irritate the skin.

In general the objects of the present invention are met by the use of the novel plasticizer of the present invention, phenyl thiosalicylate, in the manufacture of natural and synthetic elastomer compositions. In addition this plasticizer had the added advantage of melting readily at about 90° C., therefore being easily incorporated and of having a definitely beneficial effect on retarding cut growth age.

Preparation of phenyl thiosalicylate may be accomplished in any desired manner. One suitable process is shown for purposes of illustration in the following example:

EXAMPLE 1

*Preparation of phenyl thiosalicylate*

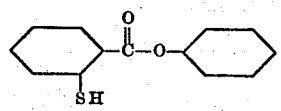

Equimolar quantities of thiosalicylic acid and phenol were mixed and melted at about 125° C., in a closed vessel equipped with a mechanical stirrer, a thermometer, a dropping funnel and a gas outlet tube connected to a drying tube. After the reaction mixture had liquefied, it was cooled to 100–105° and maintained at that temperature while a half-molar amount of phosphorous oxychloride was added slowly from the dropping funnel. After hydrogen chloride evolution had ceased, the mixture was warmed to 125° for 10 minutes, then cooled, poured into water and neutralized with sodium bicarbonate. The pink, granular precipitate was separated by filtration and recrystallized from ethanol.

Phenyl thiosalicylate exhibits a marked plasticizing action on both natural and synthetic elastomers. Effective utilization may be obtained through any conventional procedure at temperatures above about 90° C., at which temperature the compound melts. It may be incorporated using open mills, a Banbury mixer or other convention plasticator or in oven treating. In milling operations the plasticizer may be incorporated directly at operating temperatures. For oven plasticizing it is usually best to incorporate the plasticizer at temperatures somewhat below 100° C. and plasticize subsequently at somewhat higher temperatures. Typical illustrations of the use of phenyl thiosalicylate are shown in the following examples.

EXAMPLE 2

A sample of natural rubber was divided into two portions, each being treated for six minutes in a Banbury mixer using jacket and rotor temperatures of 250° F. and 212° F. respectively. In the first portion no plasticizer was used, to provide a comparison. The composition and plasticity figures are shown in the following table:

Table I

| | | |
|---|---|---|
| Smoked sheets | 60 | 60 |
| Amber crepe | 40 | 40 |
| Phenylthiosalicylate | | 0.125 |
| Plasticity tests | | |
| Williams 3 min. "Y" at 100° C., mils | 154 | 119 |
| 1 min. recovery at 100° C., mils | 42 | 20 |

EXAMPLE 3

Example 2 was repeated with a sample of GR-S (a styrene butadiene copolymer). The test portions were milled for six minutes using rotor and jacket temperatures of 212° F. and 307° F. respectively. The composition and plasticity values are shown in the following Table II.

Table II

| | | |
|---|---|---|
| GR-S | 100 | 100 |
| Phenylthiosalicylate | | 1.0 |
| Plasticity tests | | |
| Williams 3 min. "Y" at 100° C., mils | 117 | 95 |
| 1 min. recovery at 100° C., mils | 40 | 38 |

In general, in using the phenylthiosalicylate of the present invention the amounts required will vary somewhat with the elastomer composition to be treated. Natural rubber compositions, for example, often may be satisfactorily treated with as little as 0.05-0.1% by weight and seldom require more than about 2%. By comparison, synthetic elastomers of the butadiene-acrylonitrile type may require from about 1.0 to about 5.0% or more. Elastomers of the GR-S type, of the neoprene type or of butyl rubber such as GR-I usually require an amount of from about 0.5 to 1.0 and seldom more than about 3.0

I claim:

1. A method of increasing the plasticity of elastomeric compositions which comprises disseminating in an elastoprene selected from the group consisting of natural rubber, butadiene and alkyl-substituted butadiene polymers and copolymers of a conjugated diolefin hydrocarbon with styrene and acrylonitrile, 0.05-5.0% by weight of the elastoprene of phenylthiosalicylate of the formula

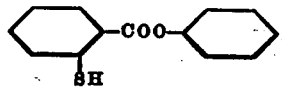

and subjecting the mixture to a temperature above 90° C. for a sufficient time to induce the desired plasticity.

2. A process according to claim 1 in which the elastomer is natural rubber and the plasticizer is used in amounts of from about 0.05 to 2.0% by weight.

3. A process according to claim 1 in which the elastomer is a styrene-butadiene copolymer and the plasticizer is used in amounts of from about 0.5-3.0% by weight.

4. A process according to claim 1 in which the elastomer is an isobutylene-isoprene copolymer and the plasticizer is used in amounts of from about 0.3-3.0% by weight.

5. A composition comprising a vulcanizable elastoprene selected from the group consisting of natural rubber, butadiene and alkyl-substituted butadiene polymers and copolymers of a conjugated diolefin hydrocarbon with styrene and acrylonitrile, having uniformly disseminated therein 0.05-5.0% by weight of the elastoprene of phenylthiosalicylate of the formula

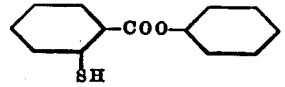

effective to produce the desired plasticity.

6. A vulcanizate obtained by vulcanizing a composition comprising sulfur, an elastoprene selected from the group consisting of natural rubber, butadiene and alkyl-substituted butadiene polymers and copolymers of a conjugated diolefin hydrocarbon with styrene and acrylonitrile, and 0.05-5.0% by weight of the elastoprene of phenylthiosalicylate of the formula

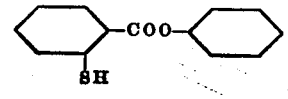

SCOTT SEARLES, JR.

REFERENCES CITED

The following references are of record in the file of this patent:

UNITED STATES PATENTS

| Number | Name | Date |
|---|---|---|
| 2,223,085 | Williams | Nov. 26, 1940 |
| 2,389,489 | Dean et al. | Nov. 20, 1945 |
| 2,392,855 | Lighbown et al. | Jan. 15, 1946 |

FOREIGN PATENTS

| Number | Country | Date |
|---|---|---|
| 542,645 | Great Britain | Jan. 21, 1942 |